United States Patent
Kim et al.

(10) Patent No.: US 8,864,376 B2
(45) Date of Patent: Oct. 21, 2014

(54) TEMPERATURE SENSING CIRCUIT

(75) Inventors: Kwang-Seok Kim, Gyeonggi-do (KR); Seong-Ook Jung, Seoul (KR); Seung-Han Woo, Seoul (KR); Kyung-Ho Ryu, Seoul (KR); Dong-Hoon Jung, Seoul (KR)

(73) Assignees: Hynix Semiconductor Inc., Gyeonggi-do (KR); Industry-Academic Cooperation Foundation, Yonsei University, Seoul (KR)

( * ) Notice: Subject to any disclaimer, the term of this patent is extended or adjusted under 35 U.S.C. 154(b) by 327 days.

(21) Appl. No.: 13/334,314

(22) Filed: Dec. 22, 2011

(65) Prior Publication Data

US 2012/0189033 A1 Jul. 26, 2012

(30) Foreign Application Priority Data

Jan. 25, 2011 (KR) .................. 10-2011-0007237

(51) Int. Cl.
*G01K 7/34* (2006.01)

(52) U.S. Cl.
CPC .................. *G01K 7/346* (2013.01)
USPC .............. 374/171; 702/99; 327/158; 375/375

(58) Field of Classification Search
CPC .................. G01K 7/00; G05F 1/567
USPC ............. 374/1, 163, 170–171; 377/25; 364/528.34; 702/99, 130; 331/56, 57, 331/66, 70, 176; 327/100, 172, 175, 187, 327/371, 378, 513
See application file for complete search history.

(56) References Cited

U.S. PATENT DOCUMENTS

| | | | | |
|---|---|---|---|---|
| 3,825,844 | A * | 7/1974 | Peterman et al. | 375/342 |
| 4,219,999 | A * | 9/1980 | Ichikawa et al. | 368/66 |
| 4,876,697 | A * | 10/1989 | Whitfield | 375/238 |
| 6,695,475 | B2 * | 2/2004 | Yin | 374/171 |
| 7,106,115 | B2 * | 9/2006 | Carley et al. | 327/164 |
| 7,518,422 | B2 * | 4/2009 | Johnson | 327/158 |
| 2006/0256908 | A1 * | 11/2006 | Ludwig | 375/375 |
| 2009/0212836 | A1 * | 8/2009 | Takahashi | 327/174 |

FOREIGN PATENT DOCUMENTS

| | | | |
|---|---|---|---|
| CN | 1971530 A | * | 5/2007 |
| JP | 10051280 A | * | 2/1998 |

OTHER PUBLICATIONS

Shankar, Creating T From SR or JK: Flip Flop Conversions Explored, Bright Hub Engineering.com, Nov. 30, 2009, pp. 1 and 2, http://www.brighthubengineering.com/diy-electronics-devices/58083-creating-t-from-sr-or-jk-flip-flop-conversions-explored/.*

Guijie Wang, et al., "The temperature characteristics of bipolar transistors fabricated in CMOS technology," Sensors and Actuators 87, 2000, 81-89.

(Continued)

*Primary Examiner* — Lisa Caputo
*Assistant Examiner* — Gregory A Royal
(74) *Attorney, Agent, or Firm* — IP & T Group LLP (57) ABSTRACT

A temperature sensing circuit includes a signal generation unit including a delay line and generating a source signal with a pulse width corresponding to a delay value of the delay line, a pulse width expansion unit configured to generate a comparison signal by expanding a pulse width of the source signal, and a change detection unit configured to sense a temperature change using a difference between the pulse widths of the comparison signal and a reference signal.

11 Claims, 4 Drawing Sheets

(56) References Cited

OTHER PUBLICATIONS

Mike Tuthill, "A Switch-Current, Switched-Capacitor Temperature Sensor in 0.6-μm CMOS," IEEE Journal of Solid-state Circuits, Jul. 1998, pp. 1117-1122, vol. 33, No. 7.

M.A.P. Pertijs, et al., "A High-Accuracy Temperature Sensor With Second-Order Curvature Correction and Digital Bus Interface," IEEE, 2001, pp. I-368-371.

Kenneth S. Szajda, et al., "A Low Noise, High Resolution Silicon Temperature Sensor," IEEE Journal of Solid-state Circuits, Sep. 1996, pp. 1308-1313, vol. 31, No. 9.

Takashi Ohzone, et al., "A CMOS Temperature Sensor Circuit," IEICE Trans, Electron., Apr. 2007, pp. 895-902, vol. E90-C, No. 4.

Ken Ueno, et al., "Ultralow-Power Smart Temperature Sensor with Subthreshold CMOS Circuits," International Symposium on Intelligent Signal Processing and Communication.

Systems, Yonago Convention Center, Tottori, Japan, 2006, pp. 546-549.

Poki Chen, et al., "A Time-to Digital-Converter-Based CMOS Smart Temperature Sensor," IEEE Journal of Solid-state Circuits, Aug. 2005, pp. 1642-1648, vol. 40, No. 8.

Kyoungho Woo, et al., "Dual-DLL-Based CMOS All-Digital Temperature Sensor for Microprocessor Thermal Monitoring," IEEE International Solid-State Circuits Conference.

Digest of Technical Papers, 2009, pp. 68-70.

\* cited by examiner

TEMPERATURE SENSING CIRCUIT

CROSS-REFERENCE TO RELATED APPLICATIONS

The present application claims priority of Korean Patent Application No. 10-2011-0007237, filed on Jan. 25, 2011, which is incorporated herein by reference in its entirety.

BACKGROUND

1. Field

Exemplary embodiments of the present invention relate to a temperature sensing circuit.

2. Description of the Related Art

A temperature sensing circuit for sensing a temperature change is one of very important circuits in an integrated circuit. For example, the temperature sensing circuit plays a very important role in a circuit for protecting a circuit at a high temperature, a circuit having operation properties varying at a predetermined temperature, and a circuit such as a thermometer. The operation speed, an internal resistance value, and the like of the integrated circuit change in response to temperature. Specifically, as the degree of integration of the integrated circuit is increased, it is more important to accurately sense a temperature change because the temperature change has a significant influence on operation processes of the integrated circuit.

Figure 1:
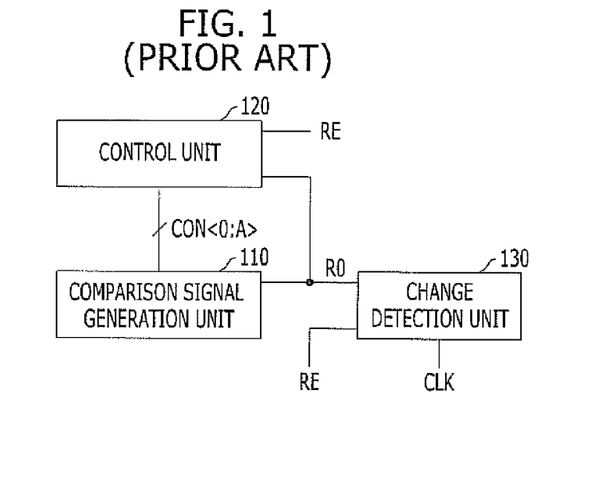
FIG. 1 is a configuration diagram of a conventional temperature sensing circuit.

FIG. 1 is a configuration diagram of a conventional temperature sensing circuit.

Referring to FIG. 1, the temperature sensing circuit includes a comparison signal generation unit 110, a control unit 120, and a change detection unit 130.

The operation of the temperature sensing circuit will be described with reference to FIG. 1 below.

The comparison signal generation unit 110 includes a plurality of delay units (not illustrated in FIG. 1) and generates a comparison signal R0. The change detection unit 130 measures the amount of temperature change using the difference between pulse widths of the comparison signal R0 and a reference signal RE. The pulse width of the comparison signal R0 corresponds to the sum of delay values of activated delay units among the plurality of delay units. The delay units are activated or deactivated in response to control codes CON<0:A> generated by the control unit 120.

In order to accurately measure the temperature change, it is desirable to perform an operation for adjusting the pulse widths of the comparison signal R0 and the reference signal RE to be substantially equal to each other at an initial temperature before a temperature sensing operation. Since the delay units may have different delay values depending on fabrication processes, if the number of the delay units activated at the initial temperature is fixed, the pulse width of the comparison signal R0 changes depending on the fabrication processes.

In this regard, in order to compensate for a change in the delay values of the delay units depending on the fabrication processes, the control unit 120 adjusts the number of the delay units to be activated until the pulse widths of the comparison signal R0 and the reference signal RE are substantially equal to each other at the initial temperature. Such an operation will be called a calibration operation.

For example, when the pulse width of the comparison signal R0 is larger than the pulse width of the reference signal RE, the control unit 120 reduces the number of the activated delay units. In an opposite case, the control unit 120 increases the number of the delay units to be activated. If the pulse widths of the comparison signal R0 and the reference signal RE are substantially equal to each other, the control unit 120 substantially maintains the number of the activated delay units.

After the calibration operation is completed, the change detection unit 130 counts a clock CLK when the pulse widths of the comparison signal R0 and the reference signal RE are different from each other. The number of countings of the clock CLK, more accurately, the time difference between the pulse widths of the comparison signal R0 and the reference signal RE is proportional to the amount of the temperature change.

In order to sense the temperature change more accurately, the comparison signal generation unit 110 may include and activate a large number of delay units. That is, when the number of delay units is large, since the sum of delay values of activated delay units significantly changes even with a slight temperature change, it is easy to measure the time difference between the pulse widths of the signals. However, the number of the delay units is increased, resulting in an increase in a circuit area. Therefore, in order to substantially increase the sensitivity of the temperature sensing circuit, the circuit area may be increased.

Since details are disclosed in "Dual-DLL-based CMOS all-digital temperature sensor for microprocessor thermal monitoring, IEEE international solid-state circuit conference, pp. 68-70, 2009", detailed description thereof will be omitted.

SUMMARY

An embodiment of the present invention is directed to a temperature sensing circuit having a reduced area while substantially maintaining resolution/sensitivity thereof.

In accordance with an embodiment of the present invention, a temperature sensing circuit includes: a signal generation unit including a delay line and configured to generate a source signal with a pulse width corresponding to a delay value of the delay line; a pulse width expansion unit configured to generate a comparison signal by expanding a pulse width of the source signal; and a change detection unit configured to sense a temperature change using a difference between the pulse widths of the comparison signal and a reference signal.

In accordance with an embodiment of the present invention, a temperature sensing circuit includes: a signal generation unit including a plurality of delay units and one or more fine delay units and configured to generate a source signal with a pulse width corresponding to sum of delay values of activated delay units among the plurality of delay units and delay values of activated fine delay units among the one or more fine delay units; a pulse width expansion unit configured to generate a comparison signal by expanding the pulse width of the source signal; a control unit configured to adjust the number of the activated delay units and the number of the activated fine delay units by comparing pulse widths of the comparison signal and a reference signal at initial temperature; and a change detection unit configured to sense a temperature change using a difference between the pulse widths of the comparison signal and the reference signal.

DETAILED DESCRIPTION

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Figure 2:
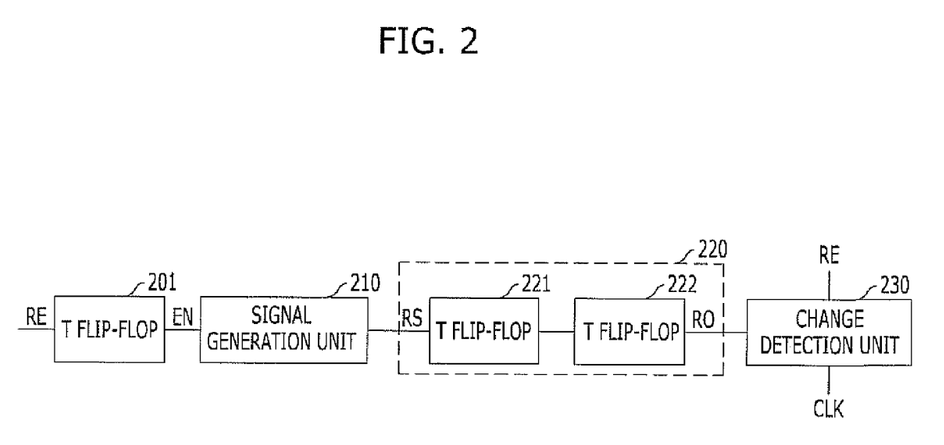
FIG. 2 is a configuration diagram of a temperature sensing circuit in accordance with an embodiment of the present invention.

FIG. 2 is a configuration diagram of a temperature sensing circuit in accordance with an embodiment of the present invention.

Referring to FIG. 2, the temperature sensing circuit includes a signal generation unit 210 having a delay line and generating a source signal RS with a pulse width corresponding to a delay value of the delay line, a pulse width expansion unit 220 configured to generate a comparison signal R0 by expanding the pulse width of the source signal RS, and a change detection unit 230 configured to sense a temperature change using the difference between the pulse widths of the comparison signal R0 and a reference signal RE.

Hereinafter, the operation of the temperature sensing circuit will be described with reference to FIG. 2.

The signal generation unit 210 includes the delay line and generates the source signal RS with the pulse width corresponding to the delay value of the delay line. The delay line includes a plurality of delay units and has a delay value corresponding to the sum of delay values of the plurality of delay units. The signal generation unit 210 is activated in response to an enable signal EN. The enable signal EN is generated by 2-dividing the reference signal RE using a T flip-flop 201.

The signal generation unit 210 may include a general ring oscillator. For reference, the simplest type of the ring oscillator is an oscillator having a configuration in which an odd number of inverters are coupled in series to one another, and the input of the first inverter is coupled to the output of the final inverter. The ring oscillator outputs a clock signal of which the 'high' period and the 'low' period substantially correspond to the sum of delay values of the inverters. The inverter may serve as the delay unit. The ring oscillator generates a clock signal through feedback of output to input.

In order to synchronize an activation time point of the source signal RS with an activation time point of the reference signal RE, the signal generation unit 210 is activated at the activation time point of the reference signal RE. In this way, the activation of the comparison signal R0 coincides with the activation of the reference signal RE, so that it is easy to recognize the pulse width difference therebetween.

The pulse width expansion unit 220 is configured to generate the comparison signal R0 by expanding the pulse width of the source signal RS. In order to expand the pulse width, the pulse width expansion unit 220 includes one or more T flip-flops 221 and 222. The T flip-flops 221 and 222 generate the comparison signal R0 by increasing the period of the source signal RS four times. Thus, the pulse width of the comparison signal R0 is four times as long as the pulse width of the source signal RS. When the number of the T flip-flops is N, the pulse width of the comparison signal R0 may be increased $2^N$ times as long as the pulse width of the source signal RS. However, the pulse width expansion unit 220 may not include the T flip-flop. That is, the pulse width expansion unit 220 may have other configurations capable of expanding the pulse width of the source signal RS with a predetermined magnification.

The change detection unit 230 is configured to sense the temperature change using the difference between the pulse widths of the comparison signal R0 and the reference signal RE. The change detection unit 230 is configured to count the number of clocks CLK corresponding to the difference between the pulse widths of the comparison signal R0 and the reference signal RE and sense the temperature change based on a counting result. The change detection unit 230 may sense the temperature change because it is proportional to a change in the pulse width of the comparison signal R0.

The pulse width expansion unit 220 expands the pulse width of the source signal RS, so that the change in the pulse width of the comparison signal R0 according to temperature is $2^N$ times as great as a change in the pulse width of the source signal RS according to temperature (the pulse width expansion unit 220 includes N T flip-flops). Consequently, the delay line may substantially maintain the same sensitivity using $\frac{1}{2}^N$ delay units as compared with the conventional art, resulting in a reduction in a circuit area.

Figure 3:
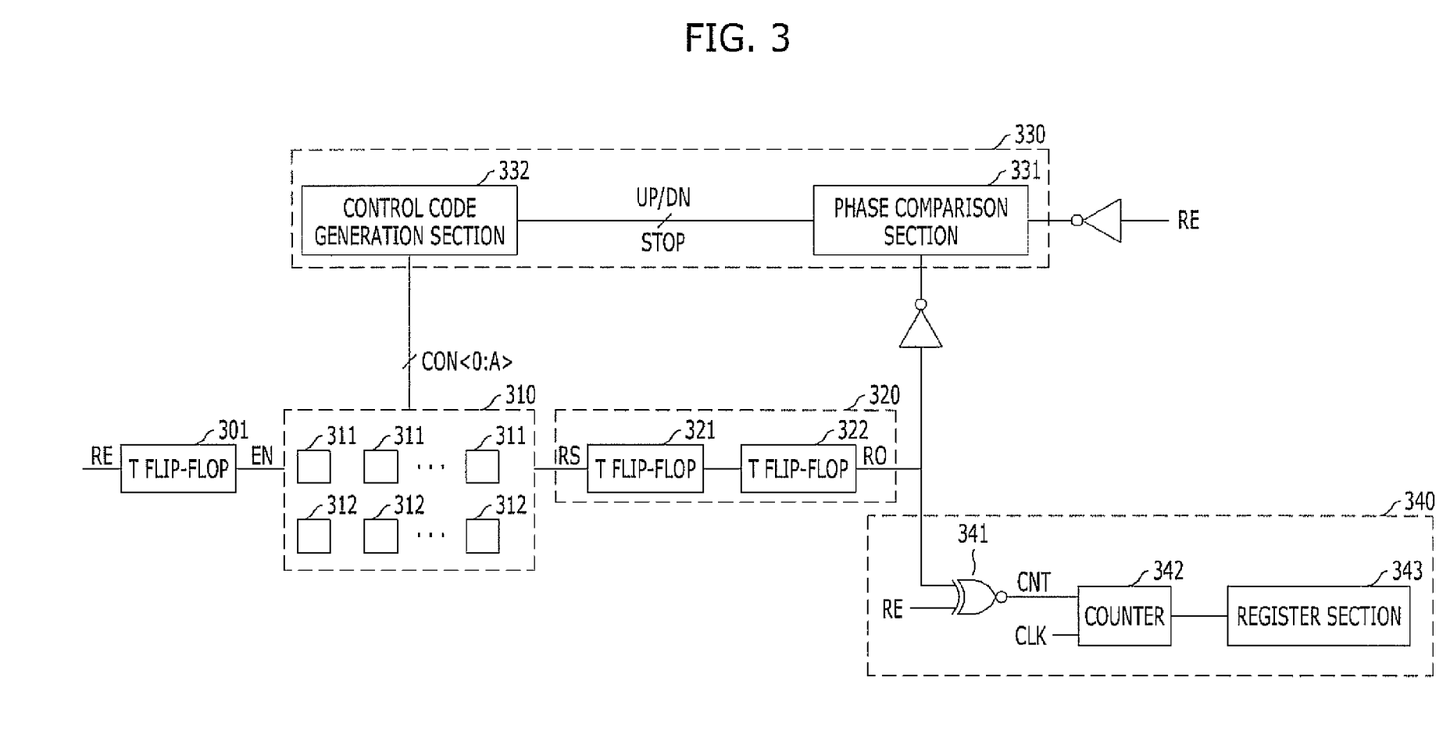
FIG. 3 is a configuration diagram of a temperature sensing circuit in accordance with another embodiment of the present invention.

FIG. 3 is a configuration diagram of a temperature sensing circuit in accordance with another embodiment of the present invention.

Referring to FIG. 3, the temperature sensing circuit includes a signal generation unit 310, a pulse width expansion unit 320, a control unit 330, and a change detection unit 340. The signal generation unit 310 includes a plurality of delay units 311 and one or more fine delay units 312 and generates a source signal RS with a pulse width corresponding to the sum of delay values of activated delay units among the plurality of delay units 311 and delay values of activated fine delay units among the one or more fine delay units 312. The pulse width expansion unit 320 is configured to generate a comparison signal R0 by expanding the pulse width of the source signal RS. The control unit 330 is configured to adjust the number of the activated delay units 311 and the number of the activated fine delay units 312 such that the pulse widths of the comparison signal R0 and a reference signal RE are substantially equal to each other at the initial temperature. The change detection unit 340 is configured to sense a temperature change using the difference between the pulse widths of the comparison signal R0 and the reference signal RE.

Hereinafter, the operation of the temperature sensing circuit will be described with reference to FIG. 3.

The signal generation unit 310 generates the source signal RS in an activation (high) period of an enable signal EN. The enable signal EN is generated by 2-dividing the frequency of the reference signal RE using a T flip-flop 301. Thus, the signal generation unit 310 is activated in response to the reference signal RE. The reason for generating the enable signal EN by 2-dividing the reference signal RE is that the activation time point of the comparison signal R0 is synchronized with the activation time point of the reference signal RE, and the enable signal EN is accurately generated even when the initial value of the pulse width of the comparison signal R0 is larger than that of the reference signal RE. If the reference signal RE is used as the enable signal EN as it is, since the maximum value of the pulse width of the comparison signal R0 is limited to the pulse width of the reference signal RE, the calibration operation may not be performed accurately.

The signal generation unit 310 includes the plurality of delay units 311 and the one or more fine delay units 312. The pulse width of the source signal RS corresponds to the sum of the delay values of the activated delay units among the plurality of delay units 311 and the delay values of the activated fine delay units among the plurality of fine delay units 312. The signal generation unit 310 generates the source signal RS substantially the same principle as the ring oscillator generates a signal. The fine delay unit 312 has a delay value smaller than that of the delay unit 311. This is for allowing the pulse width of the comparison signal R0 to more accurately coincide with the pulse width of the reference signal RE.

The signal generation unit 310 may also include the ring oscillator having a plurality of inverters as described above or a ring oscillator having a delay unit provided with a plurality of NAND gates. Other elements which may be enabled or disabled may be included as the delay unit depending on circuit design.

The pulse width expansion unit 320 may include one or more T flip-flops 321 and 322. Each of the T flip-flops 321 and 322 increases the activation period of the source signal RS twice. Thus, when the number of the T flip-flops 321 and 322 is N, the activation period of the comparison signal R0 is $2^N$ times as long as the activation period of the source signal RS. Hereinafter, the case in which the pulse width expansion unit 320 includes two T flip-flops 321 and 322 will be described.

(1) Calibration Operation

For accurate temperature sensing, the above-mentioned calibration operation is performed in order to compensate for an error in fabrication processes before a temperature sensing operation starts. According to the calibration operation, the pulse widths of the comparison signal R0 and the reference signal RE are adjusted to be substantially equal to each other at the initial temperature, When the calibration operation is performed, the control unit 330 is in an activated state and the change detection unit 340 is in a deactivated state.

The control unit 330 includes a phase comparison section 331 and a control code generation section 332. The phase comparison section 331 is configured to compare the pulse width of the comparison signal R0 with the pulse width of the reference signal RE and generate an up/down signal UP/DN. The control code generation section 332 is configured to generate control codes CON<0:A> for adjusting the pulse width of the source signal RS in response to the up/down signal UP/DN.

The phase comparison section 331 generates the down signal DN, when the pulse width of the comparison signal R0 is larger than the pulse width of the reference signal RE, and generates the up signal UP, when the pulse width of the comparison signal R0 is smaller than the pulse width of the reference signal RE. Since the comparison signal R0 and the reference signal RE are activated at the same time point, a signal with a large pulse width is deactivated later than the other. In this regard, the phase comparison section 331 may also include a phase detector that detects deactivation time points of the comparison signal R0 and the reference signal RE. The phase detector may use inverted signals of the comparison signal R0 and the reference signal RE and detect activation time point thereof.

The control code generation section 332 updates the control codes CON<0:A> in response to the up/down signal UP/DN. The control codes CON<0:A> activate or deactivate the plurality of delay units 311 and the plurality of fine delay units 312 which are included in the signal generation unit 310.

The control code generation section 332 updates the control codes CON<0:A> in response to the up signal UP so that the number of the fine delay units 312 or the delay units 311 to be activated is increased. The control code generation section 332 updates the control codes CON<0:A> in response to the down signal DN so that the number of the fine delay units 312 or the delay units 311 to be activated is decreased.

When the pulse widths of the comparison signal R0 and the reference signal RE are substantially equal to each other, a stop signal STOP is activated, the values of the control codes CON<0:A> are fixed, and the calibration operation is stopped.

When the signal generation unit 310 includes only the delay units 311, as a minimum value, the pulse width of the comparison signal R0 may be adjusted by updating the control codes CON<0:A> by $2^2$ times as large as the delay value of the delay unit. Since the comparison signal R0 is generated by increasing the pulse width of the source signal RS by $2^2$ times, if one delay unit is activated or deactivated to change the pulse width of the source signal RS by the delay value of the delay unit, the pulse width of the comparison signal R0 is changed by $2^2$ times as large as the delay value of the delay unit.

Therefore, using the pulse width expansion unit 320, the number of delay units, which is used when the comparison signal R0 has a pulse width substantially equal to that in the conventional art, is reduced to $\frac{1}{2}^2$ as compared with the conventional art. However, the resolution of the calibration operation may also be reduced. Therefore, the fine delay unit 312 with a delay value, which is $\frac{1}{2}^2$ times as small as the delay value of the delay unit 311, is used.

When the signal generation unit 310 includes $2^2$ fine delay units 312 with the delay values which are $\frac{1}{2}^2$ times as small as the delay values of the delay units 311, as a minimum value, the pulse width of the source signal RS may be adjusted by $\frac{1}{2}^2$ times as small as the delay values of the delay units 311. Thus, as the minimum value, the pulse width of the comparison signal R0 may be adjusted by substantially the same as the delay values of the delay units 311.

That is, according to the present invention, the pulse width expansion unit 320 includes N T flip-flops to reduce the number of the delay units 311 up to $\frac{1}{2}^2$ as compared with the conventional art, so that a circuit area may be reduced. Furthermore, $2^N$ fine delay units 312 with the delay values, which are $\frac{1}{2}^2$ times as small as the delay values of the delay units 311, are added, so that the minimum change value of the pulse width of the comparison signal R0 may be substantially maintained similarly to the conventional art.

For example, when 1000 delay units 311 are included in order to generate the comparison signal R0 in the conventional art, the minimum change value of the pulse width of the comparison signal R0 may be substantially equal to the delay values of the delay units 311. In the present invention, for example, only 250 delay units 311 are included in order to generate the comparison signal R0 with the same pulse width using the pulse width expansion unit 320 including two T flip-flops. Furthermore, $2^2$ fine delay units 312 with the delay values, which are $\frac{1}{2}^2$ times as small as the delay values of the delay units 311, are added, so that the minimum change value of the pulse width of the comparison signal R0 may be substantially maintained to the delay values of the delay units 311 similarly to the conventional art.

(2) Temperature Sensing Operation

If the calibration operation is completed, the control unit 330 generates the control codes CON<0:A> in a deactivated state, and the change detection unit 340 is activated. Through the calibration operation, the pulse widths of the comparison signal R0 and the reference signal RE are substantially equal to each other at the initial temperature.

If a temperature changes from the initial temperature, since the delay values of the delay units included in the signal generation unit 310 are changed, the pulse width of the source signal RS is changed and the pulse width of the comparison signal R0 is changed by $2^2$ times as much as the amount of change in the pulse width of the source signal RS.

An XOR gate 341 included in the change detection unit 340 is configured to generate a counting signal CNT which is activated only in a period in which the logic values of the comparison signal R0 and the reference signal RE are different from each other. Since the activation time points of the comparison signal R0 and the reference signal RE are substantially equal to each other, the difference between the deactivation time points of the two signals is substantially equal to the difference between the pulse widths of the two signals.

A counter 342 included in the change detection unit 340 is configured to count a clock CLK in an activated period of the counting signal CNT and a counting value is stored in a register section 343. Actually, the stored value is information on the difference between the pulse widths of the comparison signal R0 and the reference signal RE, that is, time. However, as described above, since a change in the pulse width of the comparison signal R0 is proportional to a temperature change, the amount of temperature change from the initial temperature may be detected.

Figure 4:
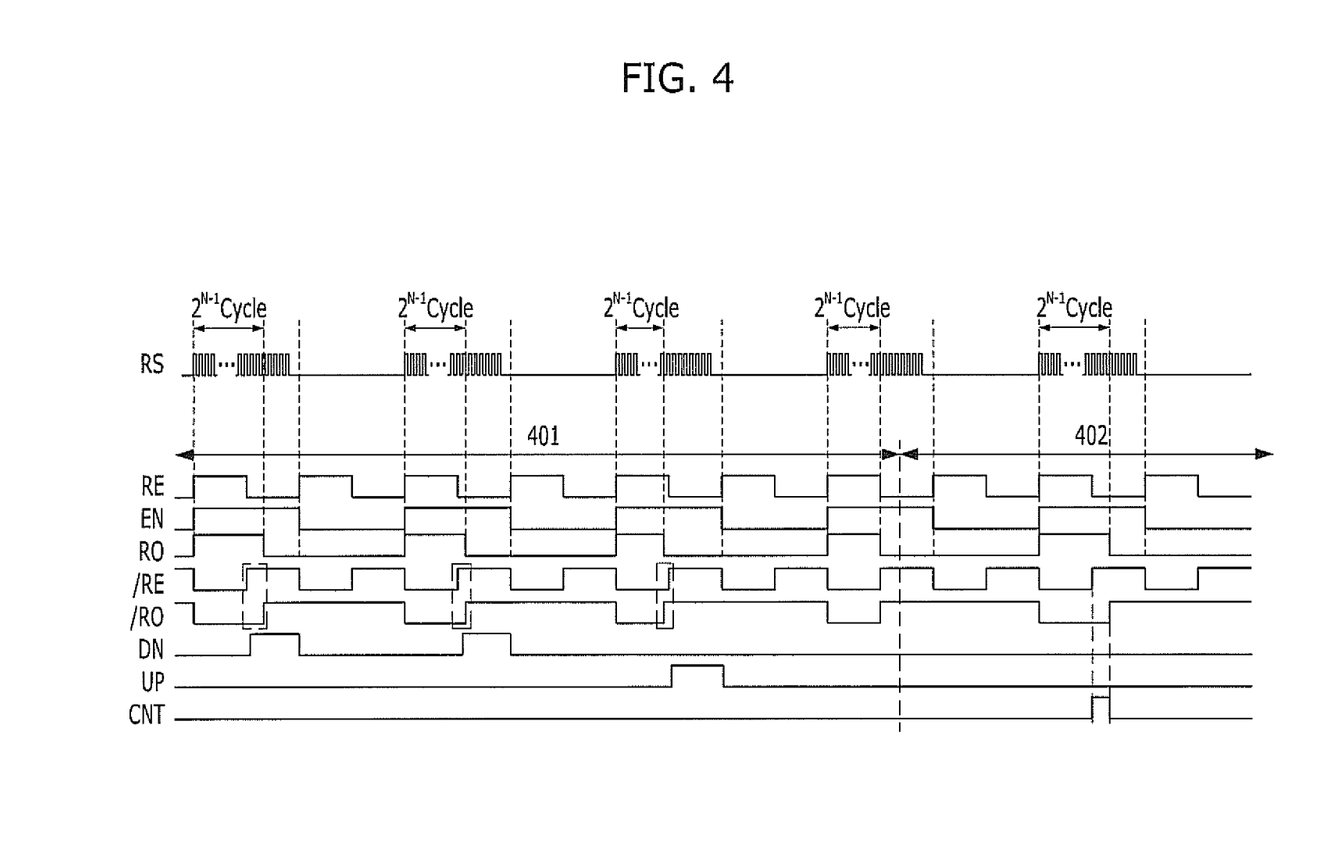
FIG. 4 is a waveform diagram illustrating the operation of a temperature sensing circuit.

FIG. 4 is a waveform diagram illustrating the operation of the temperature sensing circuit.

In a first period 401, the above-mentioned calibration operation is performed. The control unit 330 adjusts the pulse width of the comparison signal R0 until the pulse width of the comparison signal R0 is substantially equal to the pulse width of the reference signal RE at the initial temperature. At this time, a falling edge of the comparison signal R0 may be compared with a falling edge of the reference signal RE. In the case of FIG. 4, the pulse widths of the comparison signal R0 and the reference signal RE are compared with each other by comparing the rising edges of inverted signals '/R0' and '/RE' thereof with each other.

In a second period 402, the above-mentioned temperature sensing operation is performed. The change detection unit 340 generates the counting signal CNT which is activated in the period in which the logic values of the comparison signal R0 and the reference signal RE are different from each other. In this period, the number of clocks CLK is counted using the counter 342, and a counting result is stored in the register section 343.

The result stored in the register section 343 is converted into information on a temperature change and then is used for sensing temperature.

Figure 5:
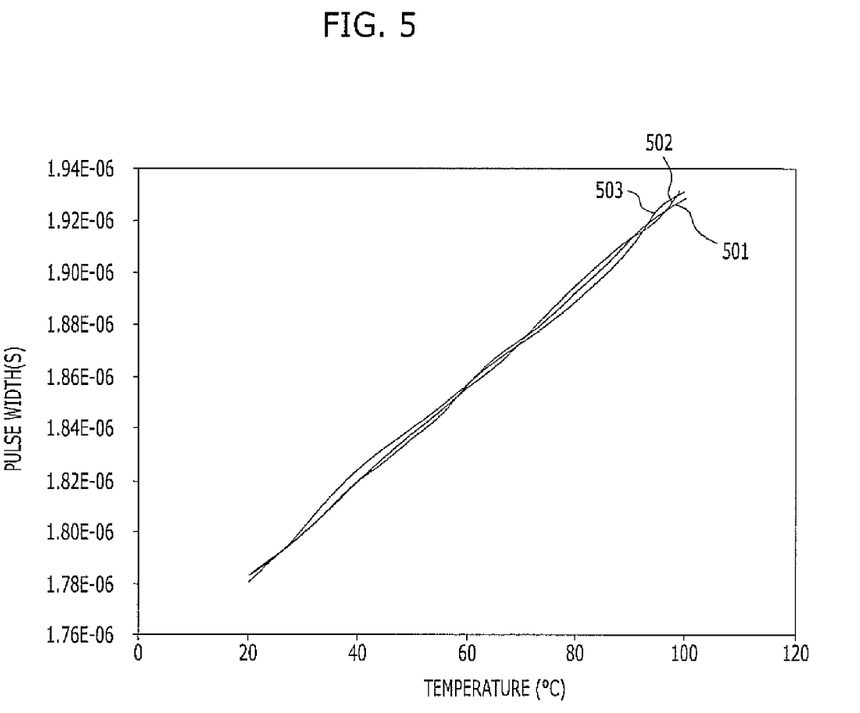
FIG. 5 is a diagram illustrating a change in a pulse width PW of a comparison signal R0 according to temperature after a calibration operation is completed.

FIG. 5 is a diagram illustrating a change in a pulse width PW of the comparison signal R0 with respect to temperature after the calibration operation is completed.

A first line 501 indicates a change in the pulse width PW of the comparison signal R0 with respect to temperature when a process corner is slow, a second line 502 indicates a change in the pulse width PW of the comparison signal R0 with respect to temperature when the process corner is typical, and a third line 503 indicates a change in the pulse width PW of the comparison signal R0 with respect to temperature when the process corner is fast. For reference, the process corner represents a variation of fabrication parameters applied in fabricating the semiconductor device.

Referring to FIG. 5, after the calibration operation is completed, the temperature and the pulse width PW of the comparison signal R0 have a linear relation regardless of the process corners.

A delay value of a delay unit may be expressed as a function of temperature T and a process term [D(T,P)], and $D(T,P)=T^{-\alpha}\cdot G(P)$. In the Equation, G(P) denotes a process-related function and is reduced as the process corner is changed from slow to fast.

In the Equation above, the pulse width PW of the comparison signal R0 may be expressed by $PW=2^2\cdot T^{-\alpha}\cdot N\cdot G(P)$. In the Equation, N denotes the number of activated delay units among the delay units of the signal generation unit 310. Thus, even when the value of G(P) is changed, it may be compensated for by changing the value of N through the calibration operation, so that the pulse width PW of the comparison signal R0 depends only on the temperature T after the calibration operation is completed.

In the temperature sensing circuit according to the present invention, the pulse width of a source signal is expanded to generate a comparison signal, so that a circuit area may be reduced, and the resolution of temperature sensing may be substantially maintained using a fine delay unit.

While the present invention has been described with respect to the specific embodiments, it will be apparent to those skilled in the art that various changes and modifications may be made without departing from the spirit and scope of the invention as defined in the following claims.

What is claimed is:

1. A temperature sensing circuit comprising:
   a signal generation unit including a delay line and configured to generate a source signal with a pulse width corresponding to a delay value of the delay line;
   a pulse width expansion unit configured to generate a comparison signal by expanding a pulse width of the source signal; and
   a change detection unit configured to sense a temperature change using a difference between the pulse widths of the comparison signal and a reference signal,
   wherein the pulse width expansion unit includes N T flip-flops, and a change in the pulse width of the comparison signal is $2^N$ times as great as a change in the pulse width of the source signal, and wherein N>1.

2. The temperature sensing circuit of claim 1, wherein the delay line includes a plurality of delay units and has the delay value corresponding to sum of delay values of the plurality of delay units.

3. The temperature sensing circuit of claim 1, wherein the signal generation unit is configured to be activated in response to the reference signal and generate the source signal in synchronization with the reference signal.

4. The temperature sensing circuit of claim 1, wherein the change detection unit is configured to sense the temperature change by counting a clock during a period corresponding to the difference between the pulse widths of the comparison signal and the reference signal.

5. A temperature sensing circuit comprising:
   a signal generation unit including a plurality of delay units and one or more fine delay units and configured to generate a source signal with a pulse width corresponding to sum of delay values of activated delay units among the plurality of delay units and delay values of activated fine delay units among the one or more fine delay units;
   a pulse width expansion unit configured to generate a comparison signal by expanding the pulse width of the source signal;

a control unit configured to adjust the number of the activated delay units and the number of the activated fine delay units by comparing pulse widths of the comparison signal and a reference signal at initial temperature; and a change detection unit configured to sense a temperature change using a difference between the pulse widths of the comparison signal and the reference signal, wherein the pulse width expansion unit includes N T flip-flops, and the activation period of the comparison signal is $2^N$ times as long as the activation period of the source signal, and wherein N>1.

6. The temperature sensing circuit of claim 5, wherein, the pulse width of the comparison signal is adjusted to be the same as the pulse width of the reference signal at the initial temperature by the control unit and the pulse width of the comparison signal varies from the pulse width of the reference signal in response to the temperature change.

7. The temperature sensing circuit of claim 6, wherein, the control unit is activated at the initial temperature and the change detection unit is activated after the pulse width of the comparison signal is adjusted to be the same as the pulse width of the reference signal by the activated control unit.

8. The temperature sensing circuit of claim 5, wherein the signal generation unit is configured to be activated in response to the reference signal and generate the source signal in synchronization with the reference signal.

9. The temperature sensing circuit of claim 5, wherein the change detection unit is configured to sense the temperature change by counting a clock during a period corresponding to the difference between the pulse widths of the comparison signal and the reference signal.

10. The temperature sensing circuit of claim 5, wherein the control unit comprises:

a phase comparison section configured to compare the pulse width of the comparison signal with the pulse width of the reference signal and generate an up/down signal; and a control code generation section configured to generate a control code for adjusting the pulse width of the source signal in response to the up/down signal.

11. The temperature sensing circuit of claim 10, wherein, when the pulse width of the comparison signal is equal to the pulse width of the reference signal, the control unit is configured to fix a value of the control code.

* * * * *